UNITED STATES PATENT OFFICE.

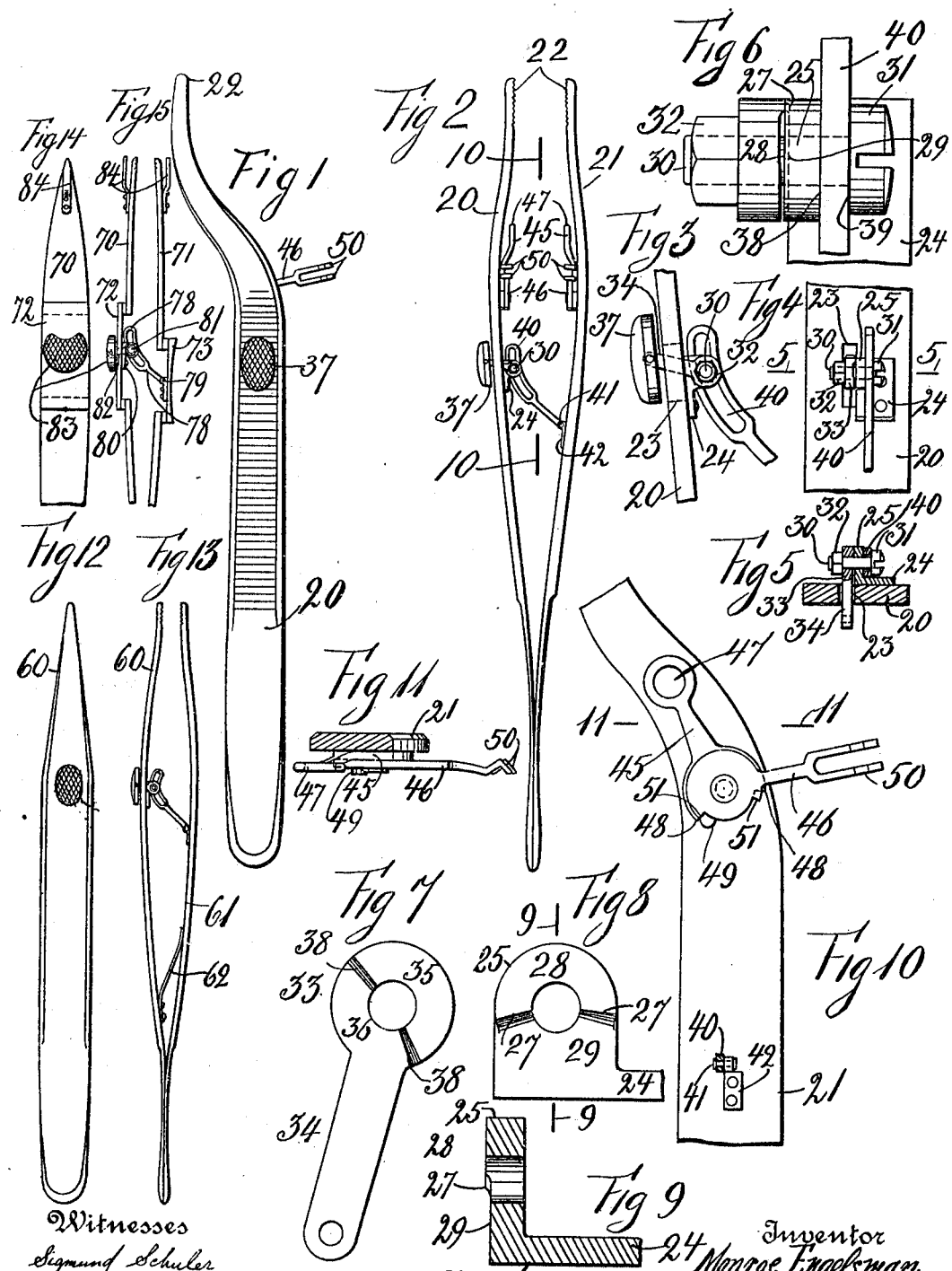

MONROE ENGELSMAN, OF NEW YORK, N. Y.

TWEEZERS.

955,955.  Specification of Letters Patent.  Patented Apr. 26, 1910.

Application filed January 13, 1908. Serial No. 410,654.

*To all whom it may concern:*

Be it known that I, MONROE ENGELSMAN, a citizen of the United States, and a resident of the borough of Manhattan, in the city, county and State of New York, have invented certain new and useful Improvements in Tweezers, of which the following is a specification.

This invention relates to tweezers, and its object is the production of a tweezer with an adjustable locking device. The character of the invention is such that the tweezer may be used without operating the locking device.

In the accompanying drawings which exemplify the invention, Figure 1 represents a front elevation of a tweezer with the invention, Fig. 2 shows a side view of Fig. 1, Fig. 3 represents an enlarged fragmentary portion of Fig. 2, Fig. 4 shows a right hand side view of Fig. 3, Fig. 5 is a section of Fig. 4 on the line 5, 5, Fig. 6 represents an enlarged fragmentary portion of Fig. 4, Figs. 7 and 8 show details of the invention, Fig. 9 is a section of Fig. 8 on the line 9—9, Fig. 10 shows a partial enlarged section of Fig. 2 on the line 10, 10, Fig. 11 represents a top view and section of Fig. 10 on the line 11, 11, Fig. 12 represents a front elevation of the invention slightly modified, Fig. 13 is a side view of Fig. 12. Fig. 14 shows a partial side view of a watchmaker's tweezer, with a further modification of the invention, and Fig. 15 is a side view of Fig. 14.

Referring particularly to Figs. 1 to 11 the tweezer is shown with the bayonet shaped main legs 20, 21 having the gripping points 22, which latter can be made of various forms for gripping diamonds, pearls, stones, parts of watches and many other articles. On the inner face of the leg 20 and adjacent to an opening 23 therein is secured the journal bracket 24. A bearing leg 25 of the latter is cut away at its lower portion forming the shoulders 27, and leaving the engaging face 28 and disengaging face 29, the latter face being below the level of the former. On a bolt 30 having the head 31 and nut 32 supported in the bearing leg 25 is supported the hub 33 having the arm 34. The hub 33 is cut away, forming the shoulders 38, and the engaging face 35 and disengaging face 36, the latter face being below the level of the former. The arm 34 passes through the opening 23 and has pinned at its outer end the push button 37. On the pin 30 is supported on one end the curved adjusting link 40, the other end of which latter is fulcrumed on the pin 41 secured in the bracket 42 extending from the main leg 21. On each of the main legs 20, 21 are fulcrumed a secondary gripping leg 45 and a secondary gripping leg 46. The gripping legs 45 have each a ring shaped gripping point 47 and the shoulders 48 which can bear against the stops 49 extending from the main legs of the tweezer. Each of the secondary gripping legs 46 has the hooked gripping points 50 and the shoulders 51, which latter can also bear against the stops 49. These secondary gripping legs 45 and 46 are respectively adapted for holding pearls, cushion edged stones and the like.

In Figs. 12 and 13 the invention is modified in substituting the ordinary tapered legs 60, 61 in place of the bayonet shaped legs 20, 21, and omitting the secondary gripping legs 45 and 46. A spring 62 may be fastened to the leg 60 and bear against the leg 61 to spring them apart.

To operate the invention an object to be gripped is caught between the gripping points as 22 and then the push button 37 is pushed forward toward said gripping points which operation will lock the legs of the tweezers in place. When the push button 37 is pushed forward the engaging face 28 of the bearing leg 25 and the engaging face 35 of the hub 33 bear against each other and tightly hold the adjusting link 40 between the rear face 38 of the boss 25 and the inner face 39 of the head 31 of the bolt 30. When the object between the gripping points of the main legs of the tweezer is to be detached the push button 37 is moved down when the disengaging faces 29 and 36 come opposite each other, which will cause the main legs to spring apart and disengage the object gripped between their gripping points. Should it be desired to use the tweezer without the locking device the push button 37 is left in its lowered position. It will be noted that the locking device is between the main legs of the tweezer and operated by a push button on the outside of one of them.

In Figs. 14, 15 are represented the legs 70, 71 of a watchmaker's tweezer. The leg 70 has an offset 72 and the leg 71 has an offset 73, which latter is concaved on its outer surface. An adjusting link 78 similar to 40 is fulcrumed on a pin 79. On the inner face of the offset 72 is secured the journal bracket 80 similar to 24 and which supports a bolt 81 with appurtenances, similar to bolt 30 and its appurtenances to form a locking device for the link 78. A boss is supported on the bolt 80 which has an arm 82 and to the latter is pinned the heart shaped push-button 83 similar to 37. To the ends of the legs 70 71 are secured brackets 84 preferably of resilient material to hold an object like the gem holder described in my U. S. Patent No. 854,158 dated May 21, 1907.

It is evident that the tweezer is useful for the watchmaker, surgeon, mechanic, jeweler and may be used for many other purposes.

Having described my invention I claim:

1. In a tweezer, the combination of an adjusting link fulcrumed to one of the legs thereof and located wholly between the legs of the tweezer, a bracket extending from the inner face of the other leg of the tweezer, and means to clamp said bracket and link together.

2. In a tweezer the combination of an adjusting link fulcrumed to one of the legs thereof, a bracket extending from the inner face of the other leg, an engaging face formed on said bracket, a bolt supported in an opening in said bracket and extending through the link, a head on the bolt bearing against said link, a hub supported on the bolt, an engaging face on the hub to coact with the engaging face on the bracket, a nut on the bolt bearing against the hub on the face opposite its engaging face, and an arm on the hub extending through an opening in the leg of the tweezer to which it is adjacent.

3. In a tweezer the combination of an adjusting link fulcrumed to one of the legs thereof, a bracket between the legs of the tweezer and extending from the other leg, an engaging and disengaging face formed on the said bracket the latter face below the former, a bolt supported in an opening in said bracket and extending through said adjusting link, a head on the bolt bearing against the outer side of the link, a hub on said bolt, an engaging and disengaging face on the hub, the latter face below the former of said hub, a nut on said bolt bearing against the outer side of the hub, an arm extending from the hub and passing through an opening in the leg of the tweezer to which it is adjacent, and a push button on the arm.

4. In a tweezer the combination of an adjusting link fulcrumed to one of the legs thereof, a bracket between the legs of the tweezer and extending from the other leg thereof, an engaging face formed in said bracket, a bolt supported in said bracket and extending through said adjusting link, a hub on said bolt having an engaging face, an arm extending from said hub and passing through an opening in one of the legs of the tweezer.

Signed at the borough of Manhattan in the county of New York and State of New York, this 6th day of January A. D. 1908.

MONROE ENGELSMAN.

Witnesses:
EMANUEL WHITE,
ALFRED A. HEVIA.